Dec. 3, 1968     A. K. MOULTON     3,414,294
TRAILER HITCH
Filed Oct. 20, 1966
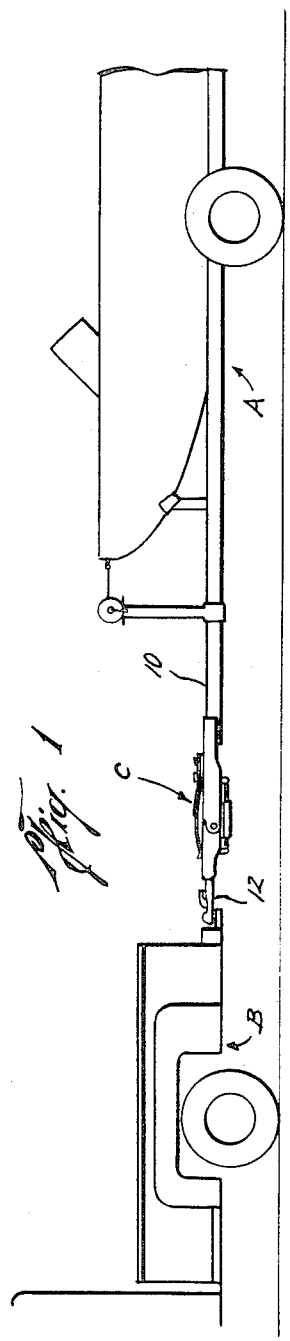
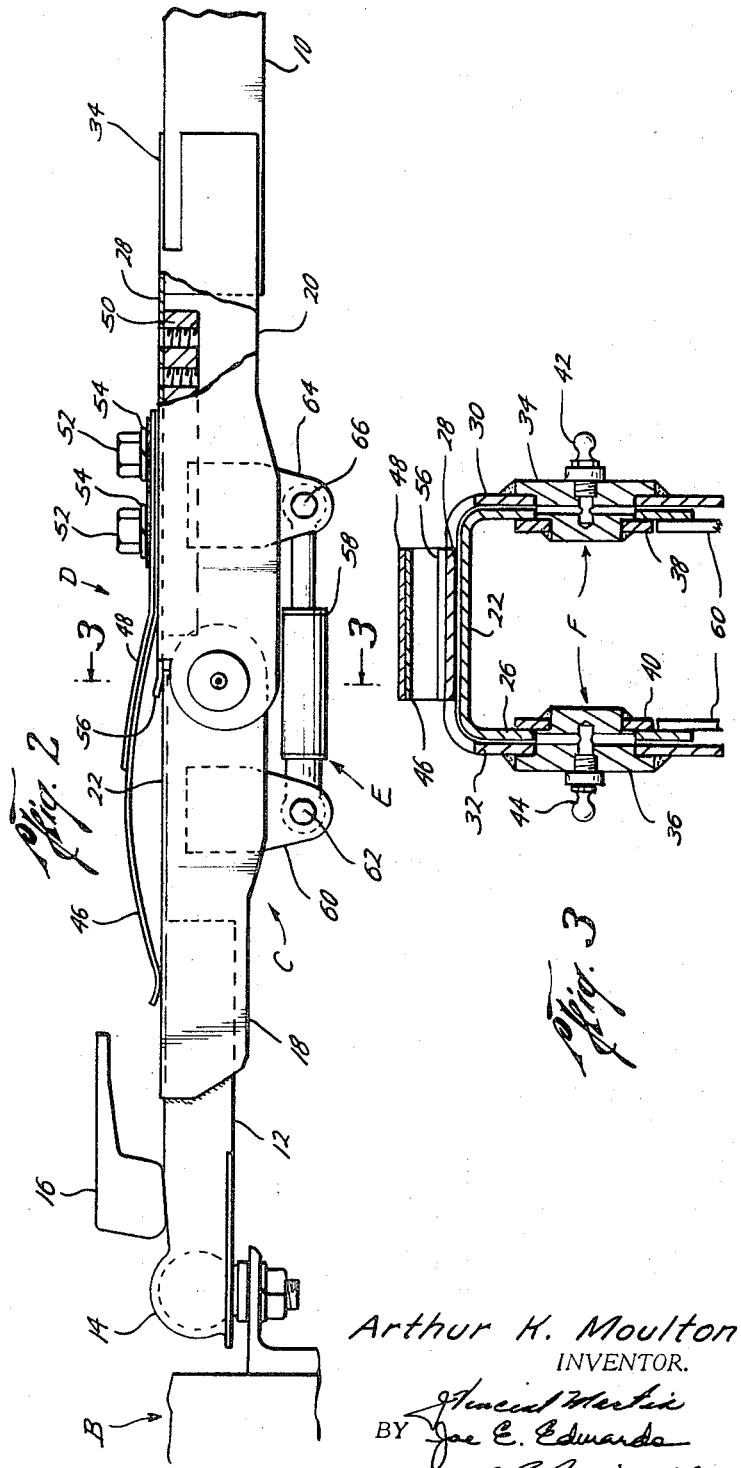
Arthur K. Moulton
INVENTOR.
BY
ATTORNEYS

United States Patent Office 3,414,294
Patented Dec. 3, 1968

3,414,294
TRAILER HITCH
Arthur K. Moulton, 7616–D Glen Prairie,
Houston, Tex. 77017
Filed Oct. 20, 1966, Ser. No. 588,029
5 Claims. (Cl. 280—489)

ABSTRACT OF THE DISCLOSURE

A pivotal joint for a trailer tongue or drawbar having two arms pivotally mounted to each other and an adjustably positioned spring exerting a force on said arms resisting pivotal movement of the arms in one direction.

---

The present invention relates to an improved trailer hitch (drawbar or tongue).

It is an object of the present invention to provide an improved trailer hitch which is rugged in construction and simple and inexpensive to build.

A further object is to provide an improved trailer hitch with a pivotal joint which may be resiliently loaded a preselected amount to provide the desired returning force compensating for differences in vertical movements of the trailer and the tractor.

A still further object is to provide an improved trailer hitch with a resiliently loaded joint which is insulated from sharp or jarring vertical movements of the trailer and tractor.

Still another object is to provide an improved trailer hitch which includes a resiliently loaded joint and avoids possible amplification of oscillations resulting from such resilient loading.

These and other objects and advantages of the present invention and the details of structure of the preferred form of the present invention are hereinafter explained in reference to the drawings wherein:

FIGURE 1 is an elevation view of the trailer hitch of the present invention and schematically showing its connection to a tractor and a trailer.

FIGURE 2 is a detailed elevation view of the trailer hitch of the present invention with portions broken away to illustrate the additional structural details.

FIGURE 3 is a partial sectional view taken along line 3—3 in FIGURE 2.

The improved trailer hitch of the present invention includes a pivotal hitch joint which is adapted to allow a degree of flexing caused by differences in the vertical movements of the tractor and trailer and is installed readily between the trailer and the the tractor.

Referring more in detail to the drawings, a trailer A is shown being towed by a tractor B and the pivotal hitch joint C of the present invention is shown installed between the trailer tongue 10 and the tractor drawbar 12. The details of the structure of the pivotal hitch joint C are more clearly illustrated in FIGURES 2 and 3. The tractor drawbar 12 is connected to the tractor B through the usual swivel joint 14 and is provided by suitable latching mechanism (not shown) actuated by the handle 16.

The hitch joint C includes the drawbar arm 18, the tongue arm 20, the adjustable resilient loading means D, the shock absorbing means E and the pivotal connecting means F. Drawbar arm 18 is secured to the drawbar 12 as by welding, and is shown to be a channel positioned with its web 22 uppermost and its legs 24 and 26 depending therefrom at each side. The tongue arm 20 is suitably secured to the tongue 10 as by welding, and is shown to be a channel positioned with its web 28 uppermost and its legs 30 and 22 depending therefrom at each side. The end of tongue arm 20, which is adapted for connection to the tongue 10, defines slots 34 at its connecting end to allow the tongue arm 28 to be readily connected to tongue 10 whether the tongue 10 has rectangular, round or other sectional shape. In the event that the tongue 10 is round, the portions of the legs and web adjacent slots 34 may be formed to fit closely around the tongue 10 and welded thereto.

The pivotal connecting means F provide a pivotal joint between the drawbar arm 18 and the tongue arm 20. The adjacent ends of arms 18 and 20 each include extensions of their respective legs which receive pivotal connecting means F to provide a pivotal joint. The pivotal connecting means F include the bearing blocks 34 and 36, which are secured as by welding to the exterior of the legs 30 and 32, respectively, the washers 38 and 40, which are secured respectively to the blocks 34 and 36 after they have been inserted through the adjacent legs of both arms 18 and 20, and the lubricating fittings 42 and 44. Thus, as shown in FIGURE 3, the bearing block 34 is welded to the leg 30, extends through circular holes defined in the leg 30 and the leg 24 and through the washer 38 which is welded to the bearing block after it has been installed through the respective legs of the two channels. The bearing blocks 34 and 36 are suitably drilled to receive the lubricating fittings 42 and 44, respectively and to provide a communication to their outer peripheries to lubricate the outer surfaces of the bearing blocks thereby reducing friction and allowing relative freedom of movement of the arms about the bearing blocks.

The adjustable resilient loading means D include the leaf spring 46 which may be one spring, as shown, or a plurality of springs depending on the force desired, the reinforcing spring 48 and the means securing the springs 46 and 48 to the web 28 of the tongue arm 20. Such securing means include the block 50 which is welded or otherwise suitably secured to the underside of the web 28 of the arm 20 and the bolts 52. The block 50 and web 28 are drilled and tapped at a plurality of positions to receive the bolts 52. The bolts 52 are provided with lock washers 54 to secure springs 46 and 48 in position when bolts 52 are in threaded engagement with the block 50. The spring 46 being secured to the web 28 of the tongue arm 20, extends over the pivotal connection means F and engages the web 22 of the arm 18. The adjustable positioning of the resilient loading means D, locates the point at which the spring 46 exerts a force on arm 18 and thereby determines the lever arm of the spring force on arm 18 in relation to the pivotal connecting means F. The connecting end of arm 20 has its web section 28 inclined upwardly at a slight angle to assure that pivotal movement of the arms 18 and 20 with respect to each other is not interfered with by engagement of the end of the web 22 with the end of the web 28. This inclined extension 56 of the web 28, however, does function as a stop means for limiting the relative movement of the arms 18 and 20 about the pivotal connecting means F, when engaged by the top side of web 22.

The shock absorbing means E include the shock absorber 58 which as shown, may be of the usual hydraulic cylinder type. One end of shock absorber 58 is secured to the arm 18 and the other end is secured to the arm 20.

It provides a dampening force resisting rapid relative movements of the arms 18 and 20. To support shock absorber 58, the brackets 60 are secured to the inside of the legs 24 and 26 of the arm 18 as by welding or other suitable means and extend downwardly as shown in FIGURE 2 to a point below the lower edge of the legs 24 and 26. Each of the brackets 60 defines a hole through which a bolt or pin 62 extends. The bolts 62 also extends through a suitable engaging means on one end of shock absorber 58. Similarly the other end of shock absorber 58 is secured to the brackets 64 depending from the interior of the legs 30 and 32 of the arm 20, each bracket defining a hole through which the bolt 66 or other suitable connecting means extends. Bolt 66 also engages suitable connecting means on the other end of shock absorber 58.

In operation, depending on the type of loading of the trailer A, the position, number and strength of the springs 46 and 48 are preselected to provide the most desirable towing conditions. For example, if very considerable weight is exerted through the trailer tongue 10 on the pivotal hitch joint C, then it is suggested that the force exerted by the spring 46 be sufficient and positioned sufficiently far from the pivotal connecting means F to assure that during normal towing conditions, the pivotal hitch joint C is positioned to maintain the tongue 10 in substantial alignment with the drawbar 12. When the trailer is being towed by the tractor B with the pivotal hitch joint C properly adjusted, any downward movement of the tongue 10 is resisted by the increased force exerted by the spring 46. Additionally, sharp or jarring movements are resisted by the shock absorbing means E. In this manner, the hitch joint C always tends to return to its preselected position and is insulated from shocks resulting from sharp vertical movements of the tractor B and the trailer A. The shock absorber 58 rapidly dampens any oscillations of the pivotal hitch joint which without such dampening may under certain towing conditions be amplified.

The effect of the force exerted by the spring 46 is dependent upon both the amount of force and also the position at which such force is exerted on arm 18 in respect to the axis of the pivotal connecting means F. For example, if additional force is needed to maintain the desired towing position of the pivotal hitch joint C, the point of engagement of the spring 46 on arm 18 is moved farther from the pivotal connecting means F, that is, to the left in FIGURE 2. If less force is needed, the point of engagemnet of the spring 46 on the arm 18 is moved closer to the pivotal connecting means F, that is, to the right in FIGURE 2.

From the foregoing it may be seen that the improved trailer hitch of the present invention provides an adjustable resilient loading of a pivotal joint to allow for variations in the vertical positioning of a tractor and trailer, to isolate said pivotal joint from shock or sharp movements and to assure that the resilient loading does not increase the amplitude of the normal pivoting of the joint when the trailer is being towed by the tractor.

What is claimed:
1. A trailer hitch, comprising:
 a first arm having a web and two legs depending therefrom,
 said legs extending beyond the end of said web at one end of said first arm,
 a second arm having a web and two legs depending therefrom,
 said legs extending beyond the end of said web at one end of said second arm,
 a pair of bearing blocks,
 each of said bearing blocks extending through holes defined in the extension of one leg of each of said arms,
 means securing each of said bearing blocks to one of said leg extensions,
 a washer secured to each bearing block and abutting the other of said leg extensions to retain said bearing blocks within said holes in said leg extensions,
 said bearing blocks, said securing means and said washers providing a pivotal connection between said arms,
 a leaf spring,
 means securing one end of said leaf spring to one of said arms in one of a plurality of positions,
 the other end of said leaf spring adapted to engage the other arm when secured to said one arm,
 a shock absorber, and
 means connecting said shock absorber between said arms to resist rapid pivotal movement of said arms about said pivotal mounting means.

2. A trailer hitch according to claim 1, including:
 a lubricating fitting secured to each of said bearing blocks,
 said bearing blocks defining lubricating passages to conduct lubricant from said lubricating fitting to the exterior of said bearing blocks within said leg extensions whereby friction of pivotal movement of said arms about said bearing blocks is minimized.

3. A pivotal joint adapted to be connected to a trailer tongue, comprising:
 a tongue arm having a web and two legs depending from opposite sides of said web,
 one end of said tongue arm being adapted to be secured to a trailer tongue,
 said legs of said tongue arm extending beyond the end of said web opposite the secured end of said tongue,
 a drawbar arm having a web and two legs depending from opposite sides of said web,
 means secured to one end of said drawbar arm for connecting said drawbar arm to a towing vehicle,
 said legs of said drawbar arm extending beyond the end of said web opposite the end to which said connecting means is secured,
 means pivotally connecting said arms to each other through said extensions of said legs,
 the web of one of said arms defining a series of longitudinally spaced holes extending through said web,
 a leaf spring defining at least one hole near one end thereof,
 fastening means adapted to extend through the hole in said leaf spring and into one of said holes in said web to position one end of said leaf spring on said web,
 the other end of said leaf spring spanning said pivotal connecting means and engaging said web of the other of said arms whereby said leaf spring exerts a force resisting pivotal movement of said arms in one direction about said pivotal connecting means and the hole in said web in which said fastening means engages determines the effective moment arm of said force with respect to said pivotal connecting means,
 a shock absorber, and
 means securing said shock absorber to said arms whereby said shock absorber resists a sudden pivotal movement of said arms about said pivotal connecting means.

4. A pivotal joint according to claim 3, wherein said fastening means includes:
 a block secured to the inside of said web which defines said plurality of holes,
 said block defining a plurality of tapped holes,
 each of said tapped holes being in register with one of said web holes, and
 a bolt adapted to extend through the hole in said leaf spring, one of said holes in said web and threadedly engage in the tapped hole in said block to secure said spring to said web.

5. A pivotal joint according to claim 3, wherein:
 a portion of one of said webs extends outward in the direction of said extensions and is adapted to engage the end surface of said other web to limit the pivotal movement of said arms in the direction opposite to said one direction.

References Cited

UNITED STATES PATENTS

| | | | |
|---|---|---|---|
| 1,119,767 | 12/1914 | Stenhart | 280—489 |
| 1,309,748 | 7/1919 | Schroeder. | |
| 2,229,720 | 1/1941 | Bramming | 287—86 X |
| 2,385,253 | 9/1945 | Black | 280—489 X |
| 2,448,436 | 8/1948 | Jones | 280—489 |
| 2,773,704 | 12/1956 | Saxon | 280—489 |
| 2,797,934 | 7/1957 | Helgeson | 280—489 |
| 2,852,274 | 9/1958 | Seiley | 280—489 |

FOREIGN PATENTS 810,503  12/1936  France.

LEO FRIAGLIA, *Primary Examiner.*